United States Patent [19]

Bezold

[11] 4,120,751

[45] Oct. 17, 1978

[54] FUEL ELEMENT SKELETON

[75] Inventor: Helmut Bezold, Erlangen, Germany

[73] Assignee: Kraftwerk Union Aktiengesellschaft, Mulheim, (Ruhr), Germany

[21] Appl. No.: 767,342

[22] Filed: Feb. 10, 1977

[30] Foreign Application Priority Data

Feb. 12, 1976 [DE] Fed. Rep. of Germany ....... 2605594

[51] Int. Cl.² .............................................. G21C 3/30
[52] U.S. Cl. ...................................................... 176/78
[58] Field of Search ............................... 176/76, 78, 81

[56] References Cited

U.S. PATENT DOCUMENTS

| 3,308,034 | 3/1967 | Schmidt | 176/78 |
| 3,515,638 | 6/1970 | Nims, Jr. | 176/78 X |
| 3,802,995 | 4/1974 | Fritz et al. | 176/81 X |
| 3,864,211 | 2/1975 | King et al. | 176/78 |
| 3,984,284 | 10/1976 | Long et al. | 176/78 |

Primary Examiner—Peter A. Nelson
Attorney, Agent, or Firm—Herbert L. Lerner

[57] ABSTRACT

Fuel element skeleton has a play-free form-locking connection between groups of structural parts thereof respectively formed of materials of varying thermal expansion, the connection having means secured to a first group of the structural parts and having respective contact surfaces on diametrically opposite sides of the first group of structural parts, the contact surfaces being disposed in a common plane perpendicular to the longitudinal axis of the means, and the contact surfaces facing in mutually opposite axial directions of the first group of the structural parts, and means provided on a second group of the structural parts for defining respective abutment surfaces disposed in a common plane and mutually spaced from one another, the abutment surfaces facing in mutually opposite directions, the first and the second groups of the structural parts being disposed relative to one another in a position wherein the contact surfaces of the first group of the structural parts are in engagement with the respective abutment surfaces of the second group of the structural parts and wherein the common plane in which the contact surfaces are disposed is coincident with the common plane in which the abutment surfaces are disposed.

11 Claims, 9 Drawing Figures

FUEL ELEMENT SKELETON

The invention relates to a fuel element skeleton and especially to such a skeleton having a play-free form-locking connection between groups of structural parts thereof respectively formed of materials of varying thermal expansion, such as connecting rods and control rod guide tubes on the one hand, as well as spacer support grids and head and base plates, on the other hand. Such a skeleton serves for receiving a multiplicity of fuel rods filled with nuclear fuel; the fuel rods and the fuel element skeleton thus form the finished fuel element. Fuel elements of such construction are employed especially for light-water nuclear reactors. The control rod guide tubes, which are provided for many types of fuel elements and are disposed at fuel rod positions, simultaneously serve as connecting rods between the head and the base plates of the fuel element. Such a fuel element skeleton must, in itself, therefore have considerable inherent strength or ruggedness and rigidity, so that also the finished fuel element also remains dimensionally stable.

For reasons based on principles of neutron physics, care must be taken that a minimum of neutron-absorbing structural material be present within a fuel element. Since the spacer support grids for holding the fuel rods are themselves made of resilient spring material, such as that known by the trade name Iconel, for example, a material with considerably less neutron absorption, such as a zirconium alloy, for example, is provided for the control rod guide tubes. The formation of a metallurgic bond or connection between the control rod guide tubes and the spacer support grids, for example, by welding or soldering, encounters very great difficulties, however, so that it has been proposed heretofore to select purely mechanical connections between these structural elements.

Although the problem of joining or connecting the spacer supports and the control rod guide tubes has been solved satisfactorily by these other heretofore-known proposals, from a strength or ruggedness aspect, it has been found, however, that these different materials exhibit differences not only as to neutron absorption but also as to thermal expansion. Since fuel elements and, therefore, also their skeletons are often subjected, however, to varying temperatures during the operation of the nuclear reactor, there arises a possibility, due to the difference in the thermal expansion and, in addition, due to neutron-induced longitudinal growth of the control rod guide tubes, that axial play will appear between the specer holders and the guide tubes in the course of the reactor operation, which presupposes a danger of a further loosening of this connection through fretting or frictional corrosion. This is true in a similar manner also for the connection between the fuel element head plate and base plate. In this regard, it should be noted that play generated in this manner also leads to rubbing or frictional movements between the spacer support grids and the fuel rods; the possibility of fretting or frictional corrosion then existing there also.

For safety reasons, however, efforts must be made from the very beginning, if possible, to prevent such phenomena, which can lead to serious trouble in the course of time.

It is accordingly an object of the invention to provide a fuel element skeleton which avoids the foregoing disadvantages of the heretofore known devices of this general type.

With the foregoing and other objects in view there is provided, in accordance with the invention, a fuel element skeleton having a play-free form-locking connection between groups of structural parts thereof respectively formed of materials of varying thermal expansion, the connection comprising means secured to a first group of the structural parts and having respective contact surfaces on diametrically opposite sides of the first group of structural parts, the contact surfaces being disposed in a common plane perpendicular to the longitudinal axis of the means, and the contact surfaces facing in mutually opposite axial directions of the first group of the structural parts, and means provided on a second group of the structural parts for defining respective abutment surfaces disposed in a common plane and mutually spaced from one another, the abutment surfaces facing in mutually opposite directions, the first and the second groups of the structural parts being disposed relative to one another in a position wherein the contact surfaces of the first group of the structural parts are in engagement with the respective abutment surfaces of the second group of the structural parts and wherein the common plane in which the contact surfaces are disposed is coincident with the common plane in which the abutment surfaces are disposed.

In accordance with another feature of the invention, the fuel element skeleton includes a pair of sleeve members respectively secured to the first group of the structural parts and having respective projections extending therefrom and formed with the contact surfaces, and the second group of the structural parts having respective portions thereof disposed between the pair of sleeve members and formed with the abutment surfaces.

In accordance with a further feature of the invention, the fuel element skeleton includes a pair of sheetmetal parts fastened to the first group of the structursal parts and formed with the contact surfaces, and the second group of the structural parts having respective portions thereof formed with the abutment surfaces.

In accordance with an added feature of the invention, the structural parts of the first group comprise connecting rods and control rod guide tubes, and the structural parts of the second group comprise spacer support grids and head and base plates with which the connecting rods and the control rod guide tubes are connected.

In accordance with an added feature of the invention, the spacer support girds are formed with grid mesh crosspieces, and projections are formed of parts of the grid mesh crosspieces, the abutment surfaces being formed on the crosspiece projections.

In accordance with an additional feature of the invention, the crosspiece parts are bent away at an angle from the respective grid mesh crosspieces.

In accordance with yet another feature of the invention, the crosspiece parts are stamped-out parts of the respective grid mesh crosspieces.

In accordance with yet a further feature of the invention, the space support grids are formed with grid mesh, and support members are secured to the spacer support grids within the respective grid mesh, the abutment surfaces being formed on the support members.

In accordance with another feature of the invention, the support members are sheetmetal sleeves having pocket-shaped stampings formed with the abutment surfaces, and a pair of curved sheetmetal parts are fastened to the first group of the structural parts and formed with the contact surfaces, the pair of sheetmetal parts being received in the pocket of the sheetmetal sleeves with the contact surfaces in engagement with the abutment surfaces.

In accordance with a further feature of the invention, the fuel element skeleton includes a pair of sleeve members respectively secured to the first group of the structural parts, the sleeve members having a radially outwardly bent casing, respective projections forming part of the casing and formed with the respective contact surfaces, the second group of the structural parts being formed with respective recesses disposed between the pair of sleeve members, the abutment surfaces forming respective defining surfaces of the recesses, the projections being received in the respective recesses with the respective contact surfaces in engagement with the abutment surfaces.

In accordance with a concomitant feature of the invention, the connection means secured to the first group of the structural parts is formed of the same material as that of the respective structural parts of the first group.

The fastening or bracing points between the control rod guide tubes and the spacer support grids or the head and base plates of the fuel elements thus all lie in a single common plane, and the holding sleeve members or sheetmetal parts are formed of the same material as that of the connecting rods and the control rod guide tubes, so that no axial displacement of any kind can occur between the structural parts which are connected together in this manner. This applies not only with respect to the varying thermal expansion, but also with respect to the neutron-induced longitudinal growth of the zirconium-alloy parts, to which the control rod guide tubes and and the fastening sleeves are subject in equal measure.

Other features which are considered as characteristic for the invention are set forth in the appended claims.

Although the invention is illustrated and described herein as embodied in a fuel element skeleton, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
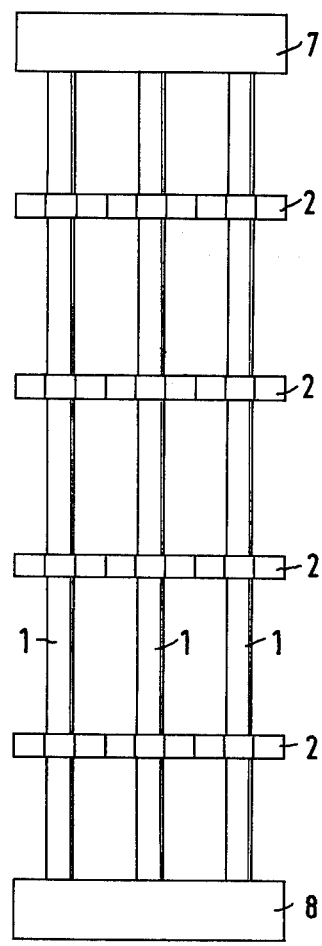
FIGS. 1 and 2 are respective diagrammatic side elevational and cross sectional views of an embodiment of the fuel element skeleton according to the invention.
Figure 2:
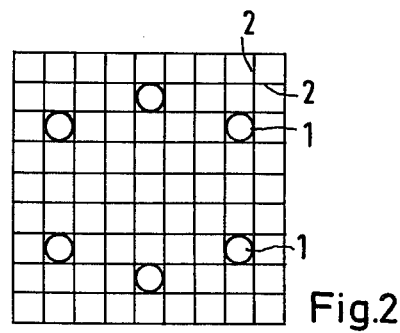

Referring now to the drawing and first, particularly, to FIGS. 1 and 2, thereof, there is shown a fuel element skeleton formed, for example, of control rod guide tubes 1, which rigidly connect a fuel element head plate 7 and a fuel element base plate 8 one to the other. Spacer support grids 2, formed of sheet metal strips disposed edgewise (see FIG. 2), are held in the respective nominal position thereof by these control rod guide tubes 1 and, for this purpose, must be rigidly connected to the latter.

A possible connection between the control rod guide tubes 1 and the spacer support grids 2 is shown in the illustrated embodiment of FIGS. 1 and 2; a very similar construction is provided in this embodiment for the connection of the head and base members 7 and 8, respectively, to the control guide tubes 1, because they, in principle, are of comparable design, even if they must be made essentially more rugged or stable overall than the spacer support grids 2. No special example is therefore shown for the connections of the head and base members 7 and 8.

According to FIG. 3, which shows in a longitudinal cross-sectional view a connection of a guide tube 1 extending through a mesh opening of the spacer support grid 2, there is provided above and below the spacer support grid 2, respective fastening sleeves 4 and 3, which are rigidly and unreleasably connected to the guide tube 1, for example, by spot weldments 5. The sleeves 3 and 4 have projections 31 and 41, respectively, which, in practice, constitute part of the cylindrical wall or shell of the respective sleeve 3, 4. According to FIG. 4, these projections 31 and 41 protrude into the corners of the spacer support mesh and engage respective surfaces of abutments 21 and 22 of the spacer support grid 2, which are disposed at the same height, namely, that of the abutment plane 6. These abutments 21 and 22 may be located on members inserted into the grid mesh opening, but may also be formed by bridge or strip members punched or bent out of the mesh walls.

Figure 5:
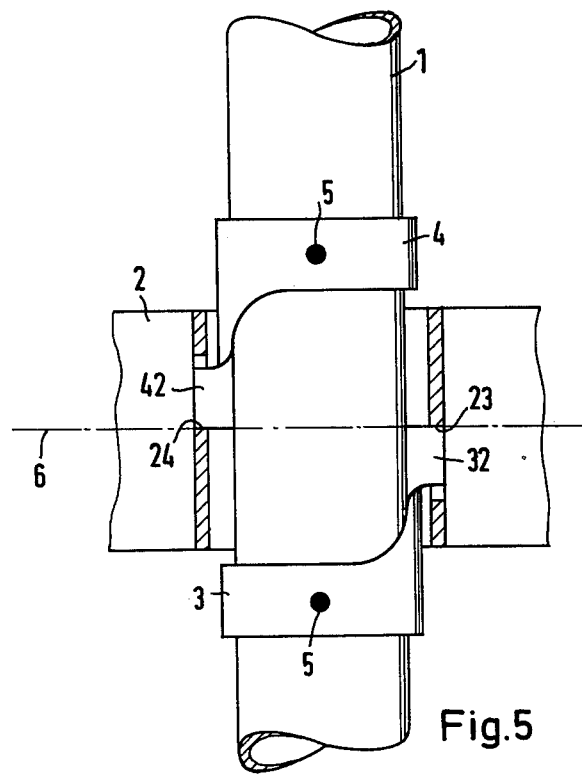
FIGS. 5 and 6 are views similar to those of FIGS. 3 and 4, respectively, of another embodiment of the invention.
Figure 6:
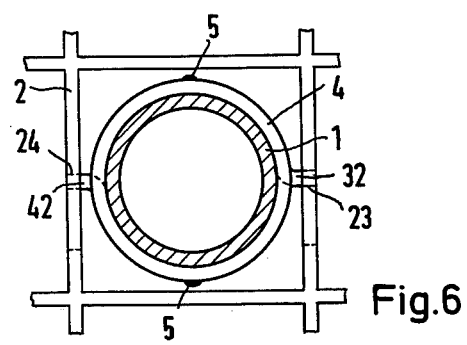

Another embodiment of the connection as illustrated in FIGS. 5 and 6 again shows the guide tube 1 with the fastening sleeves 3 and 4. The projections from the sleeves 3 and 4 are so formed in the embodiment of FIGS. 5 and 6 that the part 32 and 42, respectively, supported by the abutment surface extends radially outwardly at an angle to the main part of the sleeves 3 and 4. The projections 32 and 42 engage in recesses or cutouts formed in the adjacent wall of the spacer support mesh. The edges defining these cutouts 24 and 23, which serve as abutment surfaces are disposed at the height of the abutment plane 6, so that the relationships mentioned at the introduction hereto also prevails thereat. To form this connection, it is necessary, in this specific embodiment of FIGS. 5 and 6, also to rotate the sleeves 3 and 4 after they have been inserted into the spacer support mesh, so that the projections 32 and 42 come into engagement with the abutment surfaces 24 and 23. Thereafter, the weld connection 5 to the component 1 is produced. If, in this regard, the cutouts or recesses 23 and 24 formed in the cross-piece walls of the grid mesh for engagement by the projections 32 and 42 are disposed in such a manner that an opposite direction of rotation is required for inserting therein the projections 42 and 32, then this connection is not only rigid and rugged or strong in longitudinal direction but also secured against rotation.

Figure 7:
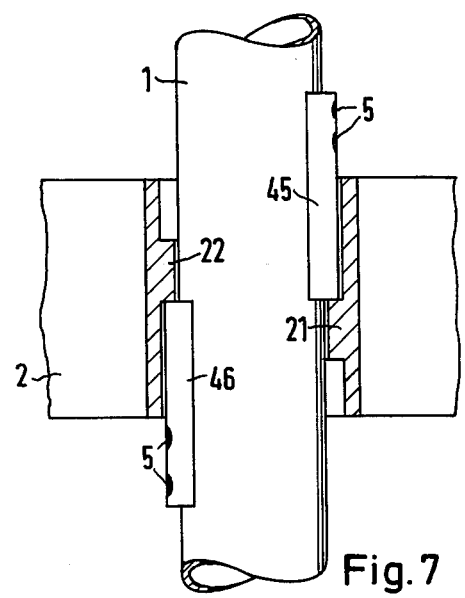
FIG. 7 is a view similar to that of FIG. 3 or FIG. 5 of yet another embodiment of the invention.
Figure 9:
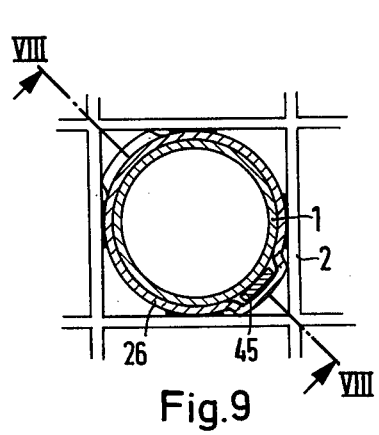
FIG. 9 is a cross sectional view of FIG. 8 taken along the line IX—IX in the direction of the arrows.
Figure 8:
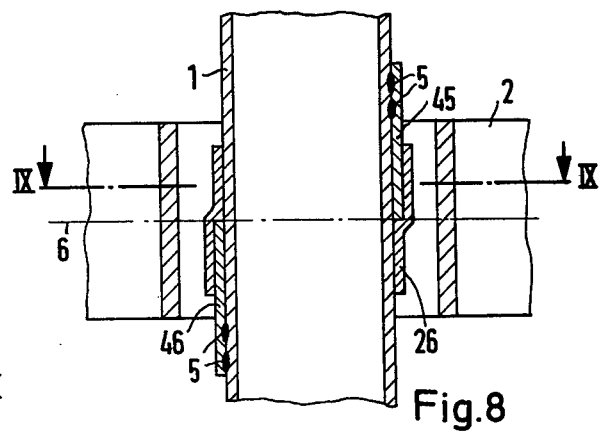
FIG. 8 is a longitudinal sectional view of FIG. 7 rotated through 45° and taken along the line VIII—VIII in FIG. 9 in the direction of the arrows.

In the embodiment illustrated in FIGS. 7 to 9, curved sheetmetal parts 45 and 46, which engage the wall of the guide tube 1 and are connected thereto, for example, by welding spots 5, are used instead of the sleeves 3 and 4.

Figure 3:
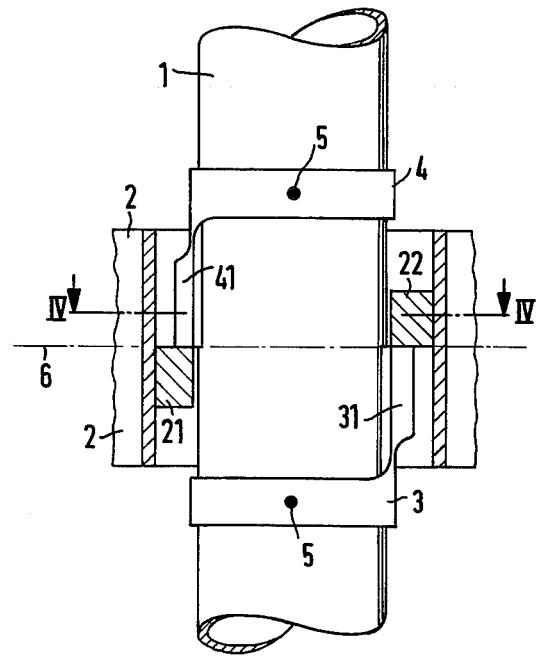
FIG. 3 is an enlarged fragmentary view of FIG. 1.
Figure 4:
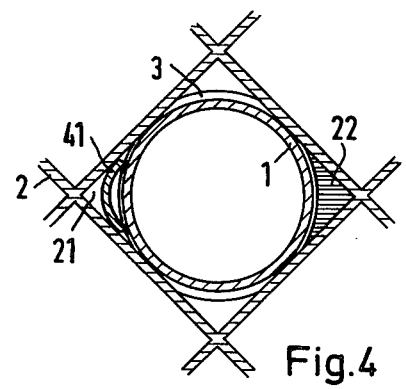
FIG. 4 is a cross sectional view of FIG. 3 taken along the line IV—IV in the direction of the arrows.

According to FIG. 7, these sheetmetal parts 45 and 46, which simultaneously also form the projections of the hereinpreceding embodiments, are supported, in a manner similar to that shown in FIG. 3, by abutment surfaces 21 and 22 in the mesh of the spacer support grid 2.

These surfaces may be stamped or punched, as shown in FIGS. 8 and 9, out of a sheet metal sleeve 26, which is connected to the spacer support mesh, for example, by being soldered therein. Due to this construction, the guide tubes 1 are simultaneously locked against rotation; it being further noted that such supports can also be provided, of course, in each corner of the respective spacer support mesh.

Obviously, the employment of other embodiments of such mechanical connections within a fuel element skeleton are conceivable without deviating from the principle of providing an axial support on a common abutment plane.

It should furthermore be noted that this type of fastening or connection is, of course, also suited for other geometries of spacer supports and head and base or end plates; for example, the outer casings of fuel elements, such as fuel element cans or jackets or guide tubes being connectible to the other parts of the fuel element skeleton in accordance with the same principle.

There are claimed:

1. Fuel element skeleton having a play-free form-locking connection between groups of structural parts thereof respectively formed of materials of varying thermal expansion, the connection comprising means secured to a first group of the structural parts and having respective contact surfaces on diametrically opposite sides of the first group of structural parts, said contact surfaces being disposed in a common plane perpendicular to the longitudinal axis of said means, and said contact surfaces facing in mutually opposite axial directions of the first group of the structural parts, and means provided on a second group of the structural parts for defining respective abutment surfaces disposed in a common plane and mutually spaced from one another, said abutment surfaces facing in mutually opposite directions, said first and said second groups of the structural parts being disposed relative to one another in a position wherein the contact surfaces of said first group of the structural parts are in engagement with the respective abutment surfaces of said second group of the structural parts and wherein the common plane in which the contact surfaces are disposed in coincident with the common plane in which the abutment surfaces are disposed.

2. Fuel element skeleton according to claim 1 including a pair of sleeve members respectively secured to said first group of the structural parts and having respective projections extending therefrom and formed with said contact surfaces, and said second group of the structural parts having respective portions thereof disposed between said pair of sleeve members and formed with said abutment surfaces.

3. Fuel element skeleton according to claim 1 including a pair of sheetmetal parts fastened to said first group of the structural parts and formed with said contact surfaces, and said second group of the structural parts having respective portions thereof formed with said abutment surfaces.

4. Fuel element skeleton according to claim 1 wherein the structural parts of said first group comprise connecting rods and control rod guide tubes, and the structural parts of the second group comprise spacer support grids and head and base plates with which said connecting rods and said control rod guide tubes are connected.

5. Fuel element skeleton according to claim 4 wherein said spacer support grids are formed with grid mesh crosspieces, and including projections formed of parts of said grid mesh crosspieces, said abutment surfaces being formed on said crosspiece projections.

6. Fuel element skeleton according to claim 5 wherein said crosspiece parts are bent away at an angle from the respective grid mesh crosspieces.

7. Fuel element skeleton according to claim 5 wherein said crosspiece parts are stamped out-parts of the respective grid mesh crosspieces.

8. Fuel element skeleton according to claim 4 wherein said spacer support grids are formed with grid mesh, and including support members secured to said spacer support grids within the respective grid mesh, said abutment surfaces being formed on said support members.

9. Fuel element skeleton according to claim 8 wherein said support members are sheetmetal sleeves having pocket-shaped stampings formed with said abutment surfaces, and including a pair of curved sheetmetal parts fastened to said first group of the structural parts and formed with said contact surfaces, said pair of sheetmetal parts being received in the pocket of said sheetmetal sleeves with said contact surfaces in engagement with said abutment surfaces.

10. Fuel element skeleton according to claim 1 including a pair of sleeve members respectively secured to said first group of the structural parts, said sleeve members having a radially outwardly bent casing, respective projections forming part of said casing and formed with the respective contact surfaces, said second group of the structural parts being formed with respective recesses disposed between said pair of sleeve members, said abutment surfaces forming respective defining surfaces of said recesses, said projections being received in the respective recesses with the respective contact surfaces in engagement with the abutment surfaces.

11. Fuel element skeleton according to claim 1 wherein said connnection means secured to the first group of the structural parts is formed of the same material as that of the respective structural parts of the first group.

* * * * *